June 30, 1970  J. KOŽNAR  3,517,533
ASSEMBLY FOR ROLLING CYLINDRICAL SURFACES
Filed July 10, 1968  2 Sheets-Sheet 1

Jaroslav Kožnar
INVENTOR.
By Richard Low
ag't

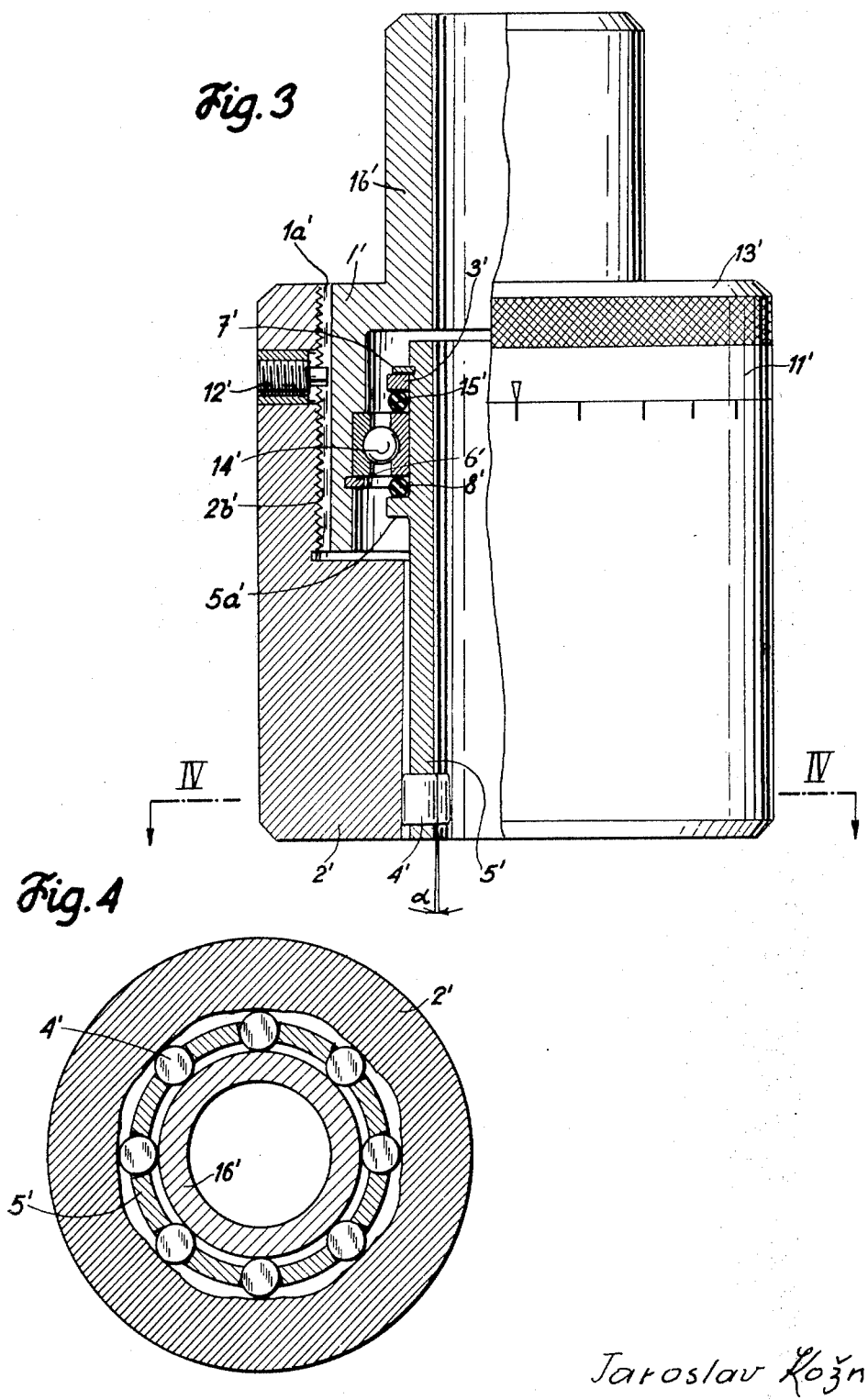

United States Patent Office 3,517,533
Patented June 30, 1970

3,517,533
ASSEMBLY FOR ROLLING CYLINDRICAL
SURFACES
Jaroslav Kožnar, Prague, Czechoslovakia, assignor to
Naradi, narodni podnik, Prague, Czechoslovakia
Filed July 10, 1968, Ser. No. 743,861
Claims priority, application Czechoslovakia,
July 15, 1967, 5,155/67
Int. Cl. B21d 3/02
U.S. Cl. 72—76                    12 Claims

ABSTRACT OF THE DISCLOSURE

An assembly for improving the qualities, such as hardness, smoothness, etc. of cylindrical surfaces. The assembly includes a plurality of roller bodies circumferentially and uniformly distributed about a predetermined axis. A cage means supports the rotary bodies for free rotary movement. An elongated tapered cam means whose axis coincides with the predetermined axis has a plurality of pressure surfaces engaging the roller bodies for urging them against the surface which is to be rolled, while between these pressure surfaces the cam means has a plurality of relief surfaces alternating with the pressure surfaces and providing relief of the pressure between the roller bodies and the cylindrical surface. A drive means is operatively connected with the cam means for rotating the latter as well as for axially feeding the cam means, and a spring means coacts with the cage means for yielding in opposition to the feed of the cam means when the pressure surfaces engage the roller bodies, while when the relief surfaces are respectively in alignment with the roller bodies the spring means brings about feeding of the cage means together with the roller bodies.

BACKGROUND OF THE INVENTION

The present invention relates to assemblies for rolling cylindrical surfaces.

Such cylindrical surfaces, which may, for instance, form parts of metal workpieces are conventionally rolled by suitable hard smooth-surfaced roller bodies to improve the structure of the worked cylindrical surface as by hardening and smoothing the later. The assembly of the invention relates to an adjustable dynamic rolling head for strengthening cylindrical surfaces and for increasing the precision of the structure thereof, the dynamic rolling head being combined with structural elements of a static rolling head.

Dynamic rolling heads of this type are known where full advantage of the high production is taken, which is achieved by dynamic rolling, and where cams impart interrupted force impulses to the roller bodies, which in this way achieve high precision of the configuration of the cylindrical surfaces, a minimum roughness of the cylindrical surfaces, and a considerable increase in the strength of the cylindrical surfaces.

However, these known constructions suffer from one primary drawback in that they are not adjustable within the extremely fine range corresponding to the extent to which the cylindrical surfaces are worked. Also, the roller bodies which work the cylindrical surfaces are loaded by a pair of forces while force equilibrium is achieved by a third force on an arm, which results in unfavorable interruption in the working of the surface that has already been worked by the preceding working cycle.

SUMMARY OF THE INVENTION

It is accordingly a primary object of the present invention to provide an assembly which will avoid the aforesaid drawbacks.

In particular, it is an object of the invention to provide an adjustable dynamic rolling head assembly where the rolling bodies are alternately pressed against the surface which is to be worked and axially fed.

In addition, it is an object of the invention to provide a construction which can very conveniently be adjusted within the extremely small range of adjustments corresponding to the extent to which the cylindrical surfaces work.

It is another object of the invention to provide a construction capable of providing a continuous adjustment within the range of adjustments. The fine continuous adjustment which hitherto could be achieved only with static heads is now achieved with the dynamic head of the invention.

It is also an object of the invention to provide a construction capable of utilizing standard elements such as standardized small roller bodies to achieve the results of the invention.

Further, it is an object of the invention to provide a construction which will first shape the surface to the required profile and will thereafter act on the surface to finish the latter.

Still another object of the present invention is to provide an assembly which can be very easily and conveniently mounted on any conventional machine tool that will provide a rotary drive as well as axial feed.

In accordance with the invention, the assembly includes a plurality of roller bodies circumferentially and uniformly spaced about a predetermined axis with a cage means supporting the roller bodies for free rotary movement. The cage means itself has an axis which coincides with the predetermined axis. An elongated tapered cam means engages the roller bodies and has also an axis coinciding with the predetermined axis. This tapered cam means has a plurality of circumferentially distributed pressure surfaces which coact with the roller bodies for pressing them against the surface that is to be worked while between these pressure surfaces the cam means has relief surfaces distributed circumferentially about the axis of the cam means and alternating with the pressure surfaces for relieving the pressure of the roller bodies against the surface which is to be worked when the relief surfaces are respectively aligned with the roller bodies. A rotary drive means is operatively connected with the cam means to rotate the latter as well as to axially feed the cam means. A spring means coacts with the cage means to yield during feeding of the cam means when the pressure surfaces of the latter engage the rollers, while this spring means brings about axial advance of the roller bodies when the relief surfaces are respectively situated in alignment with the latter so that the roller bodies are intermittingly fed together with the cam means while the cam means itself intermittingly presses the roller bodies against the surface which is to be worked.

BRIEF DESCRIPTION OF THE DRAWINGS

The invention is illustrated by way of example by way of example in the accompanying drawings which form part of this application and in which:

FIG. 3 is a partly sectional elevation of another embodiment of the invention, this embodiment being adapted to work an external cylindrical surface while the embodiment of FIGS. 1 and 2 works an internal cylindrical surface while the embodiment of FIGS. 1 and 2 works an internal cylindrical surfaces; and FIG. 4 is a sectional plan view taken along line IV—IV of FIG. 3.

DESCRIPTION OF PREFERRED EMBODIMENTS

Figure 1:
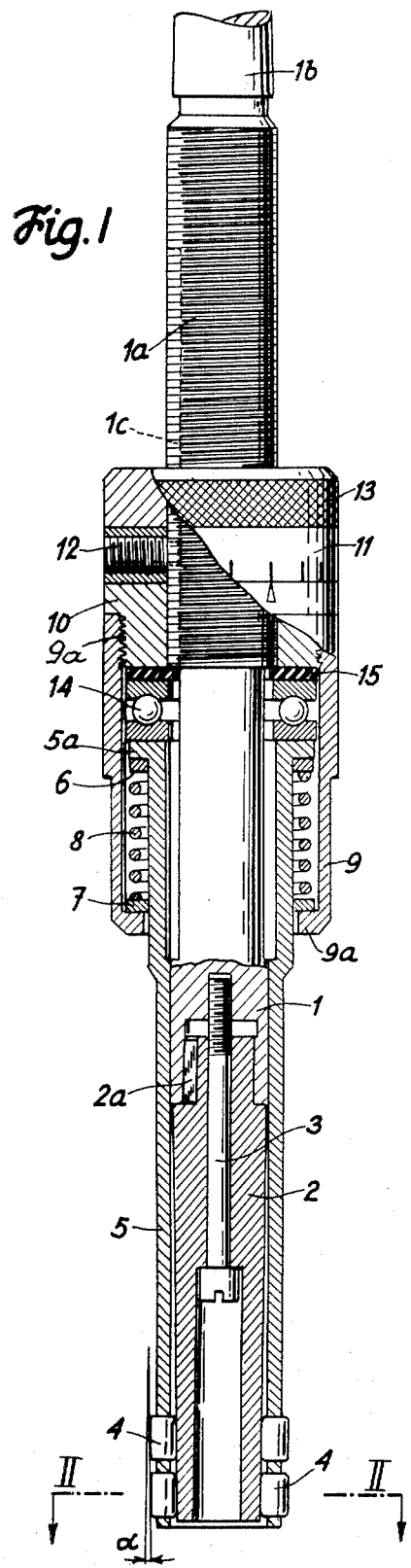
FIG. 1 is a longitudinal partly sectional elevation of one possible embodiment of a rolling head assembly of the invention.

Referring to FIG. 1 in greater detail now, the structure illustrated includes a rotary drive means 1 in the form of an elongated substantially rigid metal member which terminates at one end in a tapered portion 1b shown in the upper part of FIG. 1 in a fragmentary manner, to be received in and rigidly held by a suitable chuck which is driven in rotation by any machine tool. The opposed end of the rotary drive means 1 is fixedly connected with and carries an elongated cam means 2 which is slightly tapered in a downward direction, as viewed in FIG. 1, so that the end of the cam means 2 which is distant from the rotary drive means 1 has a smaller cross sectional area than that end of the cam means 2 which is adjacent to the rotary drive means 1.

The elongated slightly tapered cam means 2 is made of a relatively hard metal and it is coaxially fixed with the rotary drive means 1. The cam means 2 is formed with an elongated stepped bore extending along its axis so that the cam means 2 can receive in its interior a fixing bolt 3 which is threaded at its upper end, as viewed in FIG. 1, into a suitably threaded bore extending along the axis of the rotary drive means 1. In addition, the cam means 2 is provided at its upper end with a portion of reduced diameter received in a corresponding bore of the rotary drive means 1, this portion of reduced diameter having on one side an axially extending integral key 2a received in a mating axially extending groove formed in the rotary drive means 1, so that in this way the cam 2 and the drive member 1 are coaxially fixed together to form a unitary assembly which rotates as one unit.

Figure 2:
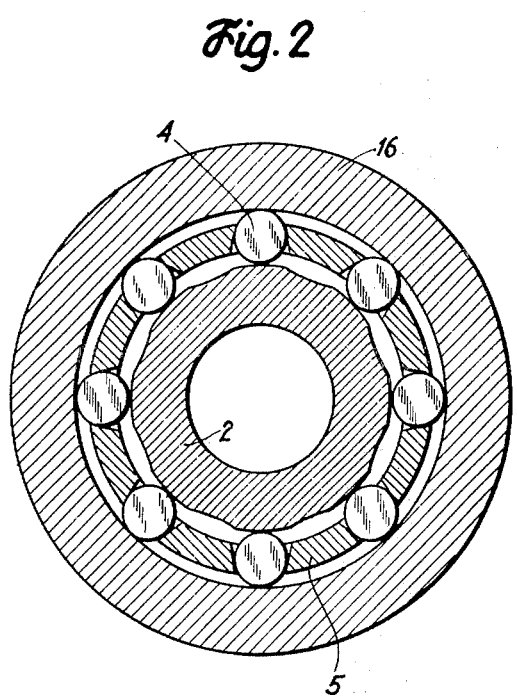
FIG. 2 is a sectional plan view taken along line II—II of FIG. 1, showing the structure to enlarged scale as compared to FIG. 1.

The embodiment of the invention illustrated in FIGS. 1 and 2 is designed to work internal cylindrical surfaces of a workpiece such as the workpiece 16 indicated in FIG. 2. For this purpose, the assembly includes a plurality of roller bodies 4 made of a suitable hard material and adapted to have rolling and pressing engagement with the cylindrical surface of the workpiece so as to provide a precisely cylindrical surface which is hard and smooth as a result of the working by the roller bodies 4. In the illustrated example, there are a pair of circumferential rows of roller bodies 4, with the bodies of each row uniformly distributed about a predetermined axis which coincides with the common axis of the rotary drive means 1 and the cam means 2. A cage means 5 supports the bodies 4 for free rotary movement, and for this purpose the cage means 5 is formed with a pair of circumferential rows of substantially rectangular openings in which the bodies 4 are situated. These openings taper in a radially outward direction, as indicated in FIG. 2, so that the bodies 4, while free to rotate, will nevertheless be retained by the cage means 5.

The configuration of the cam means 2 in cross section is most clearly shown in FIG. 2. The exterior surface of the cam means 2 is in any plane normal to the axis of the cam means provided with a circumferentially distributed series of convexly curved pressure surfaces all of which form part of a predetermined circle whose center is in the axis of the cam means 2. These convexly curved circumferentially distributed pressure surfaces are shown in FIG. 2 in engagement with the roller bodies 4. The circumferentially distributed axially extending pressure surfaces of the cam means 2 are also uniformly distributed about the axis of the cam means, and the number thereof corresponds to the number of roller bodies 4, with the angular distribution or spacing between the convexly curved pressure surfaces equalling the angular distribution or spacing between the roller bodies 4.

Between these pressure surfaces, the cam means 2 has at its exterior flat surfaces forming in any plane normal to the axis of the cam means parts of the sides of a regular polygon. These flat surfaces at the exterior of the cam means, which alternate with the convexly curved pressure surfaces, are also uniformly distributed about the axis of the cam means, and are provided in a number corresponding to the number of roller bodies 4, are all situated slightly closer to the axis of the cam means 2 than the pressure surfaces so that the flat surfaces form relief surfaces which, when they are respectively aligned with the roller bodies 4, relieve the pressure of the latter against the inner cylindrical surface that is worked. Thus, while in any plane normal to the axis of the cam means 2 the exterior surface thereof will have the cross sectional configuration illustrated in FIG. 2, the pressure surfaces and flat relief surfaces which, as has been indicated, alternate with each other extend axially along the cam means at the exterior thereof and have the slight taper indicated by the angle $\alpha$ at the lower left part of FIG. 1.

Distant from its end portion which carries the roller bodies 4, the elongated tubular cage means 5, whose axis coincides with the common axis of the rotary drive means 1 and cam means 2, has an outwardly directed flange 5a engaging a ring or washer 6 which, in turn, engages one end of a compressed coil spring 8 whose opposed end engages a ring or washer 7. The washer 6 and the flange 5a can have a sliding movement one relative to the other, and the washer 7 and an inwardly directed flange 9' at one end of an outer tubular cover 9 can also have a sliding movement one relative to the other. The tubular cover 9 is provided distant from the washer 7 with inner threads 9a by means of which it is threaded onto and fixed with an adjusting nut 10 forming part of the adjusting means of the assembly of the invention.

The adjusting nut 10 is threaded onto the exterior threads 1a of the rotary drive means 1. Thus, by turning the adjusting nut 10 on the threads 1a the position of the nut 10 and cover 9 can be adjusted axially of the rotary drive means 1. In this manner the cover 9 is adjusted with respect to the cam means 2 whose position is axially fixed with respect to the rotary drive means 1. The adjusting means further includes a ring 11 freely surrounding the rotary drive means 1 so that it does not have any threaded connection therewith. The ring 11 is free to move axially of the rotary drive means 1. However, ring 11 has a radial internally threaded bore carrying a set screw 12 the inner end of which extends into an axially extending groove 1c formed in the exterior surface of the rotary drive means 1, so that after the ring 11 has been axially positioned along the rotary drive means 1 the set screw 12 can be turned radially toward the axis of the rotary drive means 1 to press against the latter for releaseably fixing the ring 11 axially along the rotary drive means 1.

The exterior surface of the ring 11 is provided at its edge which is next to the nut 10 with a series of graduations coacting with an index carried by the nut 10 at its exterior surface, so that the angular adjustment of the nut 10 can be read at a suitable scale of the adjusting means. On the side of the ring 11 opposite from the nut 10, a lock nut 13 is in threaded engagement with the rotary drive means 1 so that, once the nut 10 and ring 11 are axially positioned and the set screw 12 is tightened, the lock nut 13 can be turned tightly against the ring 11 to reliably maintain the parts in their axially adjusted positions.

A thrust bearing 14 engages the surface of the flange 5a of the cage means 5 which is opposite from the washer 6. Between the bearing 14 and the free end surface of the nut 10, which is directed toward the bearing 14, is situated a spring means 15 in the form of a ring of yieldable elastic material, such as a rubber. The spring 8 presses the cage means 5 together with the bearing 14 against the elastic ring 15 which, in turn, is pressed against the nut 10.

As is apparent from the lower left portion of FIG. 1, the axes of the roller bodies 4 are slightly inclined with respect to the axis of the cam means 2 to the same extent that the latter tapers, so that the angle $\alpha$ which corresponds to the slight angle of inclination of the axes of the bodies 4 also corresponds to the angle of taper of the cam means 2. This angle α is on the order of 20′, which slight taper has been found to provide the best possible results during actual operations. As a result of the matching inclinations of the axes of the roller bodies 4 and the taper of the cam means 2, the pressure surfaces of the cam means 2 extend axially along the entire length of the roller bodies 4.

When the cam means 2 is rotated together with the rotary drive means 1, the roller bodies 4 will be rotated due to the engagement with the convexly curved pressure surfaces of the cam means. In addition, as the roller bodies 4 roll along the cylindrical surface of the workpiece 16 the cage means 5 also rotates. Thus, when the convex pressure surfaces of the cam means 2 press the bodies 4 against the cylindrical surface of the workpiece, the drive means 1, the cam means 2, and the cage 5 all rotate while the roller bodies 4 roll along the surface which is worked.

The machine tool which is operatively connected to the end 1b of the assembly of the invention not only rotates the drive means 1 but also provides a predetermined axial feed thereof, so that, while the roller bodies 4 are pressed against the surface which is worked, the spring means 15 is compressed as a result of the axial feed, with the cam means 2 being axially advanced to a slight extent with respect to the roller bodies 4. However, immediately after the convexly curved pressure surfaces of the cam means 2 turn angularly beyond the roller bodies 4, the flat relief surfaces of the cam means 2 become respectively aligned with the roller bodies 4, and since these relief surfaces are situated closer to the axis of cam means 2 than the pressure surfaces, the pressure on the roller bodies 4 is relieved. The spring 15 can expand and axially advance the cage means 5 through the slight increment required to return the cam means 2 to its initial axial position with respect to the cage means 5.

Thus, it is clear that during operation of the structure of the invention a pair of actions take place in rapid alternation. On the one hand, the pressure surfaces of the cam means will for a short increment of time press the roller bodies 4 against the surface which is worked while the roller bodies roll therealong, and then this short increment of time is followed by a succeeding short increment during which the pressure is relieved and the spring means 15 expands to maintain the cam means 2 axially aligned with the cage means 5. In other words, during this second increment of each operating cycle composed of a pair of these alternate movements the spring means 15 acts to permit the cage means 5 and the roller 4 to "catch up" with the cam means 2 which is axially fed together with the rotary drive means 1. Movements of radial pressure and axial feed are provided in relatively small increments and in rapid sequence for the rotary bodies 4. As a result, the circumferential rolling of the surface of the workpiece takes place with the roller bodies 4 not only rolling circumferentially about the axis of the cylindrical surface which is worked but also axially advancing therealong. In this way, the dynamic and static pressure of the roller bodies 4 along the workpiece is regulated.

As soon as the pressure of the bodies 4 against the cylindrical surface is terminated by rotation of the pressure surfaces of the cam means 2 beyond the bodies 4, the redial pressure acting on the bodies 4 ceases since they are now in alignment with the flat relief surfaces and thus can move slightly nearer the axis of the cam means 2. Due to this relaxation of the pressure on the bodies 4 the energy accumulated in the rubber ring which forms the spring means 15 brings about the axial feed of the cage means 5 and the bodies 4 in the direction in which the entire assembly is fed.

During retraction of the roller assembly of the invention out of the workpiece after the operations have been completed, it is the spring means 8 which acts to accumulate energy retarding the axial movement of the bodies 4 to such an extent that a smooth passage for the bodies 4 out of the completed cylindrical opening is assured. In other words, during axial retraction of the entire assembly away from the work it is possible for the roller bodies 4 which frictionally engage the surface to have a smooth sliding contact therewith as a result of the yieldability of the spring means 8. The latter prevents the roller bodies 4 from being pulled out with the remaining parts of the assembly at the same speed as the latter. Thus, an exceedingly smooth retraction of the roller bodies 4 is assured in a manner which will not mar the work surface.

The embodiment of FIGS. 1 and 2 is designed for the working of internal cylindrical surfaces. The embodiment shown in FIGS. 3 and 4 is designed for the working of external cylindrical surfaces. There is indicated in FIG. 4 an elongated workpiece 16′ in the form of an elongated bar which may be hollow as shown and which has an exterior cylindrical surface that is to be worked. With this embodiment, the rotary drive means 1′ has an elongated end portion 1b′ which is adapted to be releasably fixed to a driving chuck of a machine tool. An external cam means 2′ surrounds the illustrated single row of circumferentially distributed roller bodies 4′ which also are uniformly distributed about a predetermined axis coinciding with the common axis of the rotary drive means 1′ and the cam means 2′.

The cam means 2′ has an internal camming surface which is the negative equivalent of the external camming surface of the cam means 2. In this case, however, the internal pressure surfaces are concavely curved, and form in any plane normal to the axis of the cam means 2′ parts of a circle whose center is in the axis of the cam means 2′. The concave pressure surfaces are situated in this embodiment closer to the axis of the cam means 2′ than the relief surfaces of the cam means which respectively alternate with the pressure surfaces. Furthermore, with this embodiment the relief surfaces are not flat. Instead, they are also concave. Each of the relief surfaces has a radius of curvature, in any cross sectional plane, smaller than the radius of the circle along which the pressure surfaces are located. Thus, each relief surface has its own relatively small radius of curvature to provide what amounts to axially extending arcuate grooves between the pressure surfaces, as is shown in FIG. 4. These grooves and concave pressure surfaces also extend axially along the inner surface of the cam means 2′ at the relatively slight taper indicated by the angle α at the lower part of FIG. 3, the roller bodies 4′ also having this slight angle of inclination with respect to the common axis of the rotary drive means 1′ and the cam means 2′.

In the embodiment of FIGS. 3 and 4, the cam means 2′ has an internal thread 2b′ by means of which it is threaded directly onto the rotary drive means 1′. The latter has an enlarged hollow portion of cylindrical configuration, provided with external threads 1a′ which coact with the internal threads 2b′ situated at the inner surface of an enlarged cylindrical bore part of the cam means 2′. Although FIGS. 3 and 4 illustrate a single row of roller bodies 4′, it is also in this case possible to provide a pair of rows of bodies 4′ as is the case of the embodiment of FIGS. 1 and 2. The bodies 4′ are also supported for rotary movement in suitable openings of cage means 5′, with these openings tapering radially so that the roller bodies 4′ will be retained by the cage means, while at the same time being freely rotatable. These openings of the cage means which respectively receive the bodies 4′ are of a generally rectangular configuration.

In the enlarged upper bore portion of the cam means 2′, as viewed in FIG. 3, the cage means 5′ has, between its ends, an outwardly directed flange 5a′ engaging a spring means 8′ having the configuration of an elastic ring of rubber or the like and having a circular cross section. This spring means 8′ in turn engages a radial bearing 14′. This bearing 14′ has its inner race situated between the spring means 8′ and the spring means 15′ which also is in the form of an elestic ring made of rubber or the like and having a circular cross section. A snap ring 7' is situated in a suitable groove adjacent the top end of the cage means 5', as shown in FIG. 3. Between the snap ring 7' and the spring ring 15' is a washer 3'. Another snap ring 6' is situated in an internal groove of the rotary drive means 1' and engages the outer race of the bearing 14' on the same side as does the spring means 8', so that in this way the position of the cage means 5' with respect to the drive means 1' and cam means 2' is axially determined except for the possibility of axial movement of the cage means 5' with respect to the camming means 2' and drive means 1' during compression and expansion of the spring means 8' and 15'. It will be noted that the bearing 14' has its position axially fixed with respect to the drive means 1'.

The threaded connection between the cam means 2' and the drive means 1' enables the cam means 2' to be adjusted with respect to the drive means 1'. The adjusting means includes not only the internal threads 2b' and the external threads 1a' of the cam means 2' and the drive means 1', respectively, but also a freely turnable ring 11' surrounding the drive means 1' and freely movable axially along the latter, the drive means 1' being formed with an axial groove which receives the inner end of a set screw 12'. The latter enables the ring 11' to be axially fixed along the drive means 1' in engagement with the cam means 2' after the latter has been axially adjusted along the drive means 1'. In this case it will be noted that the ring 11' carries an index coacting with graduations at the adjoining edge of the cam means 2' so as to provide a scale for the adjustment of the parts. On the side of the ring 11' opposite from the cam means 2' is a lock nut 13' engaging the threads of the drive means 1' for providing a very reliable fixing of the parts in their adjusted positions.

The embodiment of FIGS. 3 and 4 operates in a manner which corresponds to that decribed above in connection with FIGS. 1 and 2. However, in the former case, the radial movements of the roller bodies 4' is the reverse of that of the roller bodies 4 in that pressure is applied during inward radial pressing of the roller bodies 4' against the external cylindrical surface of the workpiece 16' by the pressure surfaces of the cam means 2', which are situated closer to the axis of the cam means than the concave relief surfaces. The drive means 1' is rotated and axially fed by the machine tool and progresses axially along the workpiece 16' which is received during working thereof to an increasing extent within the hollow interior of the cage means 5'. During pressure of the bodies 4' against the exterior cylindrical surface of the workpiece the spring means 8' is compressed, while the bodies 4' roll along the surface which is worked, and the cage means 5' turns together with the cam means 2' and drive means 1'. During those short increments when the concave relief surfaces are aligned with the roller bodies 4', respectively, the pressure on the latter is relieved and the spring means 8' can expand to bring about axial feeding of the roller bodies 4' and the cage means 5' in the short increments which alternate with the increments during which the roller bodies 4' are radially pressed against the surface that is worked. The concave relief surfaces permit the roller bodies 4' to be displaced slightly away from the axis of the cam means 2' to bring about axial feeding by way of the spring means 8'. Thus, with this embodiment it is the spring means 8' which brings about the axial feeding of the cage means 5' and roller bodies 4' during working operations, so that the spring means 8' of this embodiment corresponds to the spring means 15 of the embodiment of FIG. 1. During retraction of the tool from the workpiece it is the spring means 15' which acts in a manner similar to the spring means 8 in order to provide for retarding for the roller bodies 4' as they are retracted from the work after the operations have been completed.

It is to be noted that with both embodiments it is immaterial whether the workpiece is rotated with respect to the roller assembly of the invention or whether the assembly of the invention is rotated with respect to the workpiece.

The fundamental idea of the invention resides in the provision of the tapered internal or external cam coacting with the roller bodies to provide for the alternate pressure and axial movement thereof. Also, the mutual position of the cage means and cam means relative to each other is adjustable.

Therefore, with the invention the drawbacks of known dynamic rolling heads are eliminated by the taper of the cam means whose taper is on the order of 20', the hard cam being surrounded by the cylindrical roller bodies whose position can be finely and continuously adjusted by axial feed on the work surfaces of the tapered cam.

The working operations are carried out very satisfactorily due to the fact that the axes of the cylindrical roller bodies are inclined with respect to the central axis of the entire tool by a precisely selected small value. This inclination of the roller body guarantees a pure working operation along their entire length while the entire load acts on these bodies. The advantage of the invention resides in the combination of the high productive output of the dynamic head with the possibility of a fine continuous adjustment which is the advantage of static heads.

In addition, with the structure of the invention, a simple assembly of standard elements such as standardized small rollers is made possible. The initial roll of cylindrical roller bodies preforms the surface to the precisely required profile while the second roll finishes the surface in a remarkably precise manner with respect to the geometric configuration thereof. The quality of this surface is highly superior, having a roughness which at a minimum is $0.05\mu$.

It is to be noted that with a conventional machine tool the structure of the invention can be mechanically as well as manually fed.

I claim:

1. In an assembly for rolling cylindrical surfaces, a plurality of roller bodies adapted to engage the cylindrical surface which is to be rolled, said bodies being uniformly distributed circumferentially about a predetermined axis, cage means having an axis coinciding with said predetermined axis and coacting with said roller bodies to support the latter for free rotary movement while engaging the surface which is to be rolled, elongated tapered cam means also having an axis coinciding with said predetermined axis, said cam means engaging said roller bodies and having a plurality of circumferentially distributed pressure surfaces for engaging said roller bodies and pressing them against the surface which is to be roller, said elongated tapered cam means having also a plurality of circumferentially distributed relief surfaces alternating with said pressure surfaces and relieving the pressure between said roller bodies and surface which is to be rolled when said relief surfaces are respectively aligned with said roller bodies, rotary drive means operatively connected to said cam means for rotating the latter about its axis while said cam means and rotary drive means are axially fed along said predetermined axis, and spring means coacting with said cage means for urging the latter with respect to said cam means in the direction in which said rotary means is fed along said axis, so that when said pressure surfaces engage said roller bodies the latter press againt the surface which is to be rolled while when said relief surfaces are respectively aligned with said roller bodies said spring means acts to advance said roller bodies axially, said rotary means feeding said cam means in opposition to the force of said spring means during engagement of the said pressure surfaces of said cam means with said roller bodies.

2. The combination of claim 1 and wherein said cage means surrounds said cam means and said roller bodies project outwardly beyond an exterior surface of said cage means to engage an internal cylindrical surface for rolling the latter.

3. The combination of claim 1 and wherein said cam means surrounds said cage means and said roller bodies extend inwardly beyond an internal surface of said cage means for engaging an outer cylindrical surface which is surrounded by cage means and roller bodies to be rolled by the latter.

4. The combination of claim 1 and wherein there are a pair of circumferential rows of roller bodies carried by said cage means.

5. The combination of claim 2 and wherein said pressure surfaces are convexly curved while said relief surfaces are flat and located closer to said predetermined axis than said convexly curved pressure surfaces.

6. The combination of claim 3 and wherein said pressure surfaces are concave while said relief surfaces are also concave and respectively have radii of curvature smaller than those of said pressure surfaces with said relief surfaces situated at a greater distance from said predetermined axis than said pressure surfaces.

7. The combination of claim 1 and wherein said spring means is in the form of an elastic ring of compressible material.

8. The combination of claim 1 and wherein a bearing means coacts with said cage means to support the latter for free rotary movement with respect to said cam means and rotary drive means.

9. The combination of claim 1 and wherein a second spring means coacts with said cage means for resiliently and yieldably resisting movement of said cage means together with said cam means and rotary drive means in an axial direction opposed to said feed direction.

10. The combination of claim 1 and wherein an adjusting means coacts on the one hand with said rotary drive means and on the other hand with said cam means and cage means for adjusting the position of said cam means and cage means with respect to each other and said rotary drive means.

11. The combination of claim 10 and wherein said rotary drive means has an exterior threaded surface, said adjusting means including an adjusting nut threadedly carried by said drive means at said surface thereof, a ring freely surrounding and movable axially with respect to said rotary drive means and engaging said nut, means for fixing said ring in an adjusted position along said rotary drive means, and a lock nut carried by said threaded surface of said rotary drive means and engaging said ring.

12. The combination of claim 10 and wherein said cam means has a threaded connection with said rotary drive means, a ring freely surrounding and axially movable with respect to said rotary drive means and engaging said cam means, means for fixing said ring in an adjusted axial position along said rotary drive means, and a lock nut engaging said ring at a side thereof opposite from said cam means.

References Cited

UNITED STATES PATENTS

| | | | |
|---|---|---|---|
| 1,318,962 | 10/1919 | Brinkman | 72—120 |
| 3,247,695 | 4/1966 | Linithicum et al. | 72—126 |
| 3,444,714 | 5/1969 | Gustkey | 72—76 |

RICHARD J. HERBST, Primary Examiner

U.S. Cl. X.R.

72—122, 126